United States Patent [19]
Akkerman

[11] Patent Number: 5,195,721
[45] Date of Patent: Mar. 23, 1993

[54] FAIL SAFE VALVE ACTUATOR

[75] Inventor: Neil H. Akkerman, Houston, Tex.

[73] Assignee: AVA International Corporation, Houston, Tex.

[21] Appl. No.: 676,841

[22] Filed: Mar. 28, 1991

Related U.S. Application Data

[63] Continuation-in-part of Ser. No. 518,942, May 4, 1990, abandoned.

[51] Int. Cl.⁵ .................. F16K 31/04; F16D 7/02; F16D 43/20
[52] U.S. Cl. .................. 251/129.13; 192/56 R; 192/81 C; 192/56 C; 74/424.8 VA; 464/30; 464/40
[58] Field of Search .................. 251/69, 129.13; 192/56 R, 81 C, 56 C; 74/424.8 VA; 464/40, 30

[56] References Cited

U.S. PATENT DOCUMENTS

| 2,930,571 | 3/1960 | Vogl .................. 251/69 |
| 4,273,307 | 6/1981 | Malinski et al. . |
| 4,502,269 | 11/1984 | Travenol . |
| 4,660,428 | 4/1987 | Payne . |
| 4,741,508 | 5/1988 | Fukamachi . |

FOREIGN PATENT DOCUMENTS 1125747 4/1966 United Kingdom .
2211274 6/1989 United Kingdom .

OTHER PUBLICATIONS

U.K. Patent Office Examiner's Search Report (Apr. 23, 1992) in Applicant's corresponding U. K. Application No. 9107939.2.

Primary Examiner—Arnold Rosenthal
Attorney, Agent, or Firm—Vaden, Eickenroht, Thompson, Boulware, & Feather

[57] ABSTRACT

A fail safe valve actuator is disclosed that is powered by an electric motor. A valve stem with a helical groove is moved in one direction by a ball nut rotated by the electric motor to move a valve member to its operating position. The valve member is held in operating position by a solenoid. When power fails, a spring moves the valve stem in the other direction to move the valve member to its fail safe position. A torque limiting device protects the electric motor from the high torque created when the valve stem abruptly stops moving when the valve member reaches its operating position. A centrifugal brake absorbs a portion of the energy released when the power fails and the valve stem is moved rapidly to its fail safe position by the spring.

39 Claims, 10 Drawing Sheets

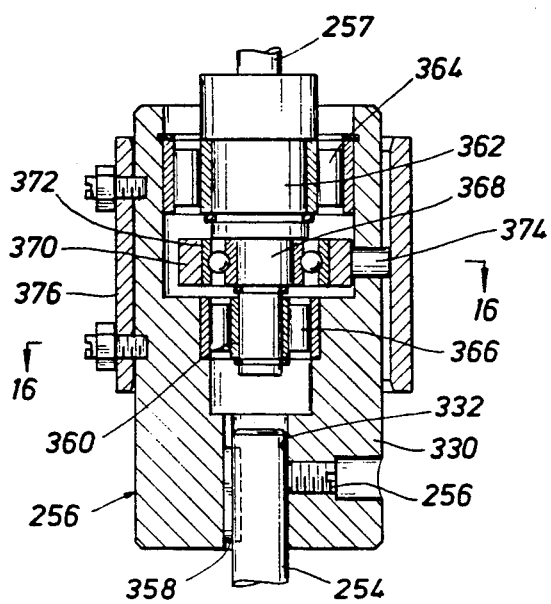
FIG.15
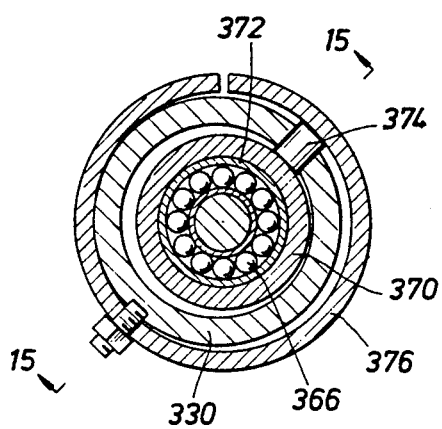
FIG.16
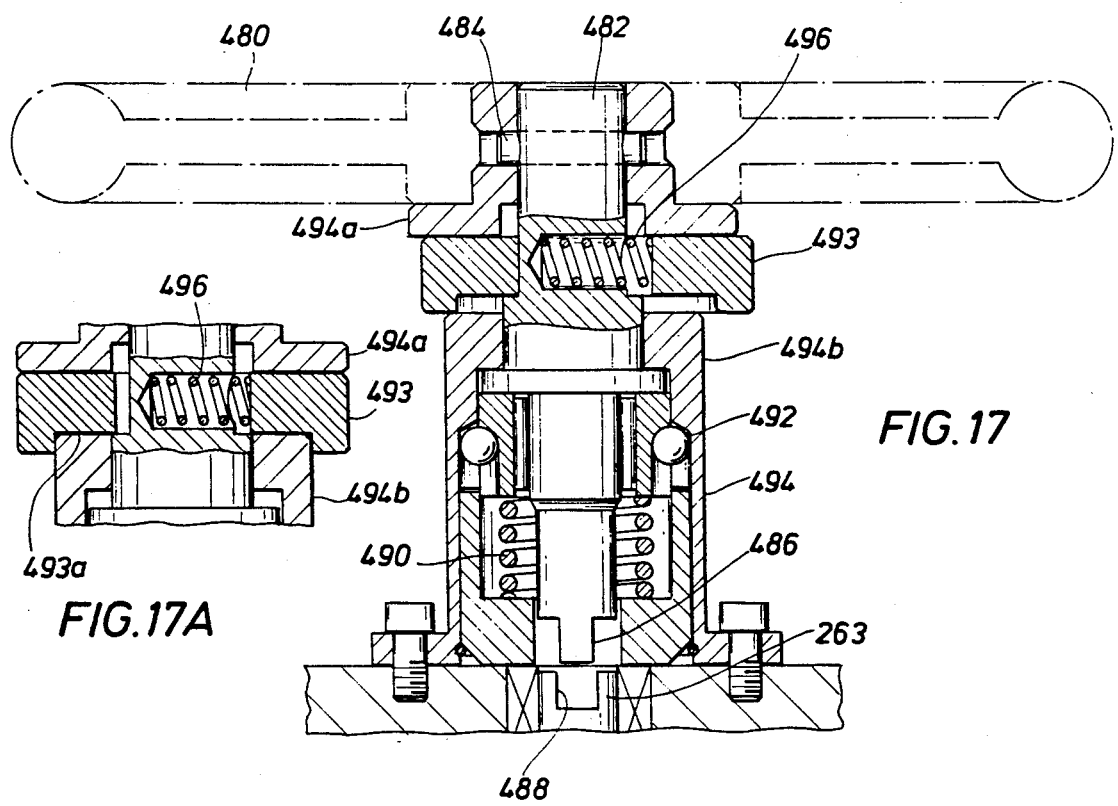
FIG.17
FIG.17A

FAIL SAFE VALVE ACTUATOR

This invention is a continuation-in-part of my copending application Ser. No. 07/518,942, filed May 4, 1990, and entitled "Fail Safe Valve Actuator", and now abandoned.

This invention relates generally to electrically powered fail safe valve actuators for use with valves in which the valve member is moved between open and closed positions by reciprocation. More particularly, in at least one of its aspects, it relates to improvements in actuators for gate valves in which the gate is moved between its alternate positions by a rising stem.

The actuator of this invention uses a low friction, reversible drive mechanism, much like that disclosed in U.S. Pat. No. 4,691,893, entitled "Fail Safe Gate Valves and Actuators Therefor", which issued on Sept. 8, 1987, and is assigned to the assignee of this application. The actuator described therein is powered by fluid pressure, i.e., fluid pressure moves the valve stem in one direction to either open or close the valve. This is the operating position. If fluid pressure is lost, a coil spring moves the valve stem in the other direction to its fail safe position. More particularly, the actuator includes a helically grooved portion of the valve stem which extends through a ball nut to manually move the valve stem back to its operating position should that be desirable after a pressure failure.

The preferred embodiment of the actuator of this invention also employs a valve stem having a helical groove and a ball nut that engages the grooved section to move the valve stem to its operating position. The valve stem is moved by a coil spring to the other or fail safe position should there be a power failure, which releases the holding device. However, the ball nut is rotated by an electric motor, and the valve stem is held in operating position by a holding device which is released upon the loss of supply of electrical power to the motor.

There are problems, however, with this arrangement when, for example, the electric motor rotates the ball nut and moves the valve stem to its operating position. When the valve stem reaches that position, it hits a positive stop. A positive stop is preferred because it makes sure the valve stem stops at the preselected position every time. When it is so stopped, however, the electric motor could be damaged if the power is not turned off quickly. This is difficult to do at the same time and make sure the valve stem reaches the proper position each time.

Therefore, it is an object of this invention to provide an actuator of this type in which the electric motor may continue to rotate after the valve stem reaches the desired position.

It is a further object of this invention to provide such an actuator in which the output shaft of the motor is disconnected from the ball nut when the output torque of the electric motor reaches a preselected amount.

It is a still further object to provide alternative embodiments of a device for limiting torque on the output shaft of the motor which is of simple and inexpensive construction and which, when the motor is shut off, will automatically return to a position for limiting such torque upon subsequent movement of the valve member to its operative position.

Another problem with using an electric motor is the high starting torque produced by the motor. Such starting torque could trip the torque limiting device due to the inertia of the system. For this and other reasons, in one embodiment of this invention, a centrifugal clutch is positioned between the electric motor and the torque limiting device so that torque is transmitted to the torque limiting device only after the speed of the motor has increased and the output torque has decreased.

In one embodiment of this invention, the actuator holds a valve in its operating position by a solenoid operated detent. In another embodiment, the actuator holds the valve in its operating position by a solenoid holding a wrap spring clutch engaged on a one-way clutch on the output shaft of the electric motor. In either event, if the valve is a rising stem type gate valve, the pressure of line fluid in the valve body acting over the cross-sectional area of the stem, assisted by the spring that was compressed when the valve stem was moved by the ball nut to its operating position, will move the valve stem very rapidly in the opposite direction. The ball nut in and of itself offers little, if any resistance, to this return movement of the valve stem. Therefore, the power train that transmits the torque from the electric motor to the ball nut is subjected to a tremendous amount of energy in a very short period of time.

Therefore, it is a further object and feature of this invention to provide an actuator of this type in which a large part of this energy is dissipated to retard the movement of the valve stem and thus protect the power train.

These and other objects, advantages, and features of this invention will be apparent to those skilled in the art from a consideration of this specification, including the attached drawings and appended claims.

IN THE DRAWINGS

FIG. 15 is a sectional view partly in elevation of an alternate embodiment of a torque limiting device;

FIG. 16 is a view taken along line 16—16 of FIG. 15;

FIG. 17 is a sectional view of an assembly including a handwheel for manually operating the valve if the electric motor fails, with the handwheel shown disengaged;

FIG. 17a is a sectional view of the disc assembly of FIG. 17 in the shifted position;

Figure 1:
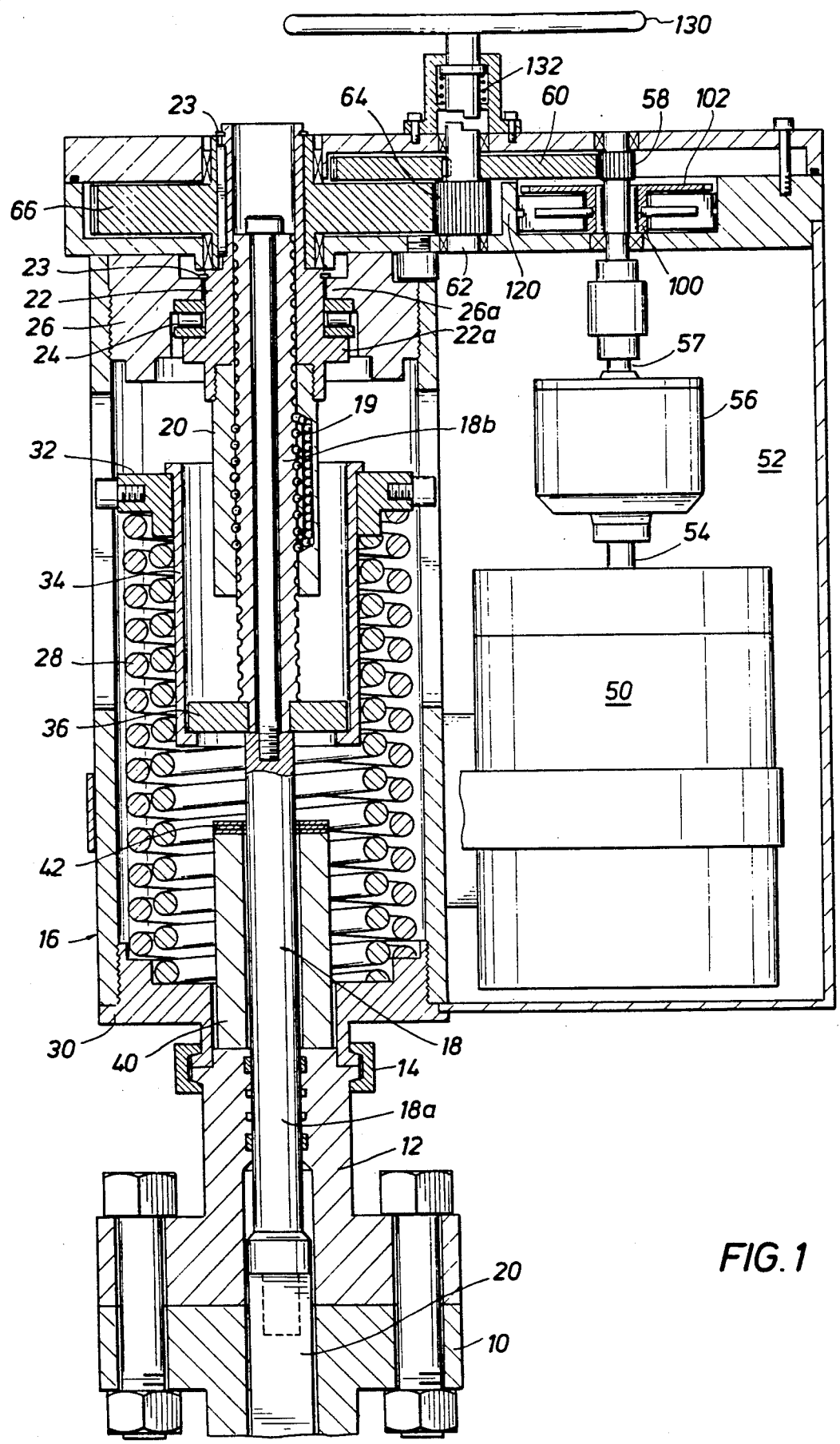
FIG. 1 is a side view partly in section and partly in elevation of one embodiment of the actuator of this invention.

In FIG. 1, an embodiment of the actuator of this invention is shown mounted on valve body 10 by connecting it to stuffing box housing 12, which is bolted to the body. C-clamp 14 attaches actuator housing 16 to stuffing box housing 12. Valve stem 18 extends through the stuffing box housing and has its lower portion 18a connected to valve member 20 for moving the valve member between open and closed positions as the valve stem is reciprocated. Upper portion 18b of the valve stem includes a screw with helical groove 19 to receive the balls in ball nut 20. Ball nut 20 is mounted for rotation in actuator housing 16 by tubular sleeve 22 that is connected to the top of the ball nut and is supported for rotation relative to the actuator housing by snap rings 23. Between shoulder 22a on the sleeve and annular flange 26a on the upper housing section 26 is thrust bearing 24 that transfers the upward thrust imposed on the ball nut to upper housing section 26 of the actuator housing as the ball nut is rotated to move the valve stem downwardly and compress spring 28. The spring is positioned between bottom plate 30 of the housing and spring ring 32 that rests on the top of the spring. Spring ring 32 supports inner sleeve 34 that transmits the downward force of the valve stem to the spring ring to compress the spring through disc 36 that is connected to the valve stem in the manner shown.

Although the actuator is shown to be a ball nut and helically grooved screw, as in the actuator of the prior patent, this invention contemplates that other low friction, reversible drives may be used including those, for example, having other helically grooved nuts which receive helically grooved screws but in which elements other than balls are in rolling engagement with the grooves. Also, of course, the screw may be supported for rotation in the body and the nut connected to the gate stem.

Stop means are provided to stop the downward travel of the valve stem when the valve reaches its operating position. In the embodiment shown, sleeve 40 is positioned on top of stuffing box housing 12 to engage disc 36 and stop the downward movement of the valve stem. Actually, shims 42 on top of the sleeve are the first to engage the disc. Using the shims allows the distance traveled by the valve stem to be adjusted as required for the particular valve with which the actuator is being used.

In the actuator of this invention, the ball nut is rotated by electric motor 50 mounted in an open section 52 of the housing 16. Output shaft 54 of the motor is connected to a centrifugal clutch and a torque-limiting device both located in housing 56. Output shaft 57 of the torque-limiting device is connected to pinion 58 in the gear housing portion of the actuator housing. Pinion 58 drives gear 60, which rotates shaft 62 and pinion 64, which is in engagement with large diameter gear 66. This gear rotates tubular sleeve 22 and ball nut 20 and thus causes the valve stem to move longitudinally to its operating position and to compress spring 28.

Figure 2:
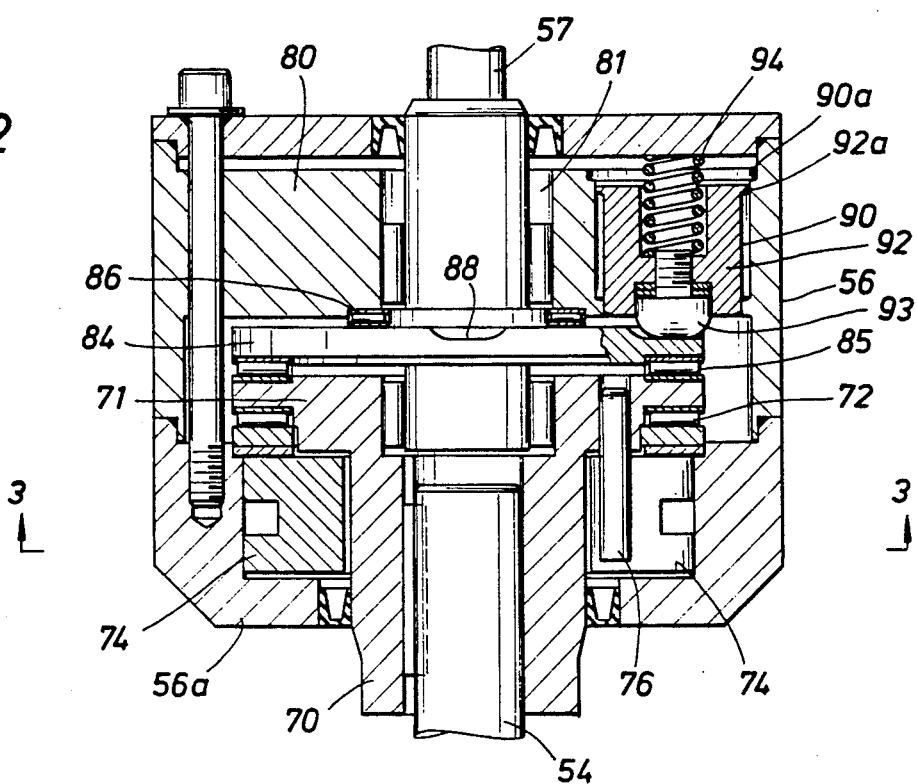
FIG. 2 is a sectional view through one embodiment of the torque limiting device and the centrifugal clutch with spring loaded detents of the torque limiting device shown in position to transmit.
Figure 3:
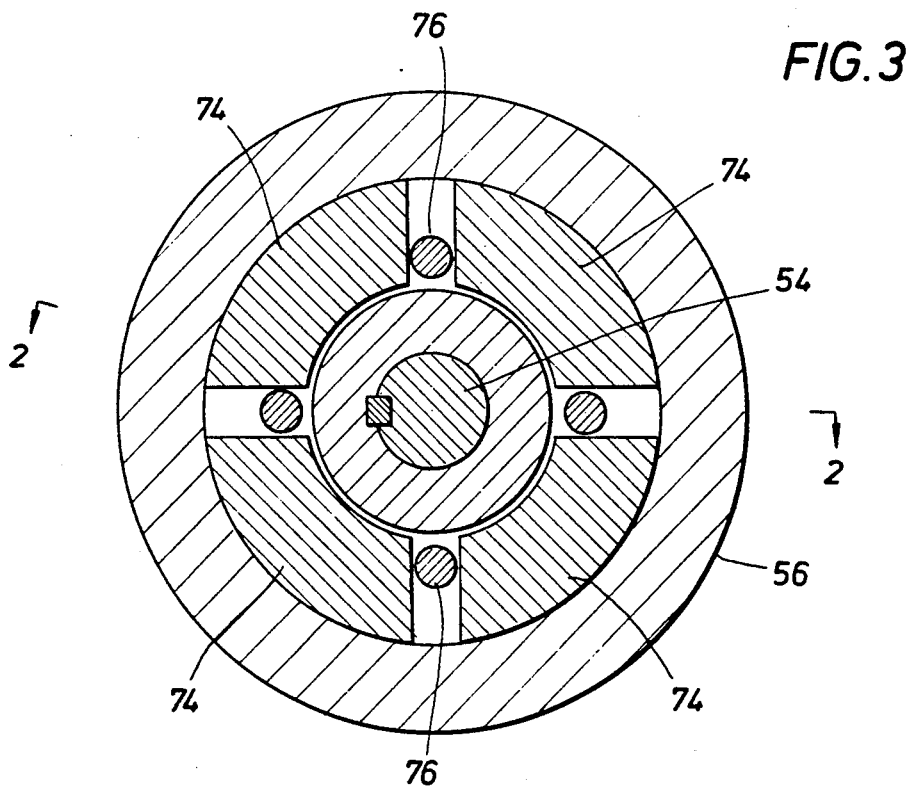
FIG. 3 is a view of the clutch taken along line 3—3 of FIG. 2.

FIG. 2 is a sectional view of the centrifugal clutch and the torque-limiting device located in housing 56. Output shaft 54 of the electric motor is keyed to sleeve 70. Upper flange portion 71 of the sleeve is supported in housing 56 for rotation by bearings 72. Flange 56a at the bottom of housing 56, and the sleeve, cooperate with the sidewall of the housing provide an annular space in which a plurality of clutch shoes 74 are located. As sleeve 70 is rotated by output shaft 54, it rotates pins 76 located between the shoes, as shown in FIG. 3, causing the shoes to rotate with the sleeve and, due to centrifugal force, be pressed against the wall of housing 56. When the centrifugal force is sufficient to provide enough friction to transmit torque without undue slippage between the shoes and the housing, housing 56 will rotate with output shaft 54.

The torque limiting device is in the upper portion of housing 56 which includes an upper wall 80 above the centrifugal clutch having a central opening 81 through which output shaft 57 extends. Located below wall 80 and attached to shaft 57 is circular plate 84, which is supported for rotation in the housing by bearing 85 supported on flange portion 71 and upper bearing 86.

The upper surface of plate 84 is provided with a series of indentations 88 to receive detents in the form of buttons 93 carried on the lower side of wall 80. A plurality of holes 90 extend through the body, each to raise a detent body 92 having a tapped countersunk opening in its lower surface to receive a detent button 93. The button has a threaded shank to connect to the tapped hole and a rounded head to engage the indentations. The detent buttons are positioned in a circle around the central axis of the device to engage within indentations 88 on plate 84, as shown in FIG. 2, where they are held by springs 94 held down by a cover over the wall 80. When the centrifugal clutch is engaged and the motor is running, the housing 56 will rotate with disc 84 as long as the detents are in engagement with the indentations. As the torque increases, the lateral force between the detent buttons and the sloping wall of the indentations increases. When the valve stem stops moving, the detents will be forced laterally out of the indentations to disconnect the electric motor from output shaft 57.

Figure 4:
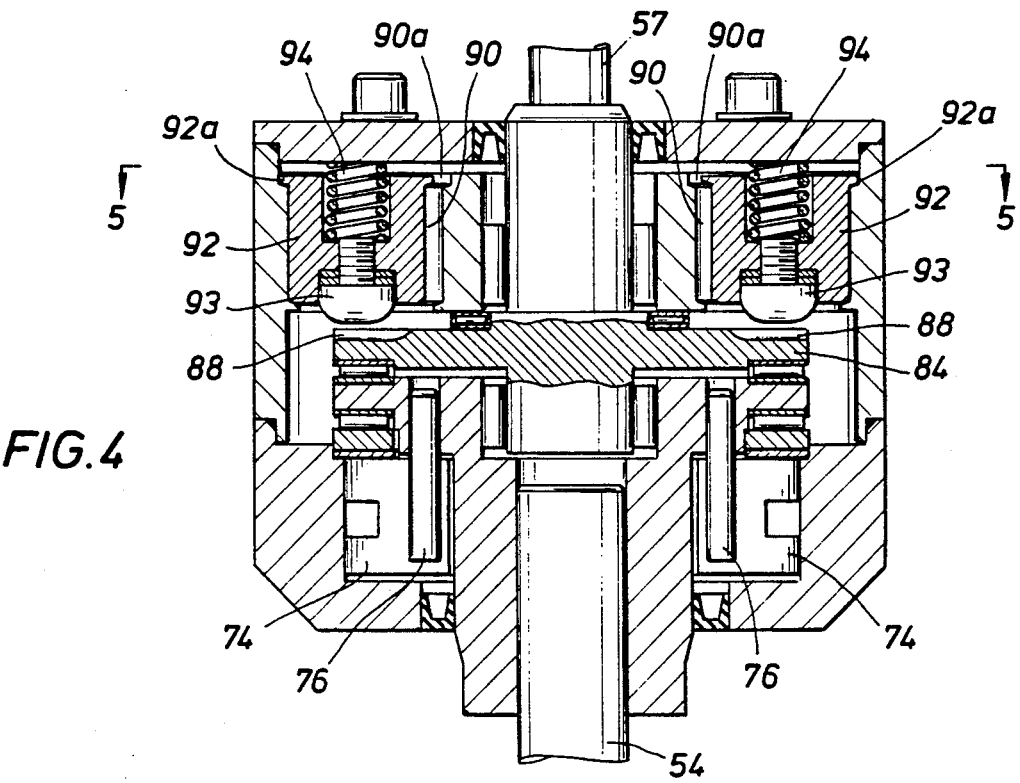
FIG. 4 is a view similar to FIG. 2 with the torque limiting device in position to disconnect the electric motor from the output shaft connected to the ball nut.
Figure 5:
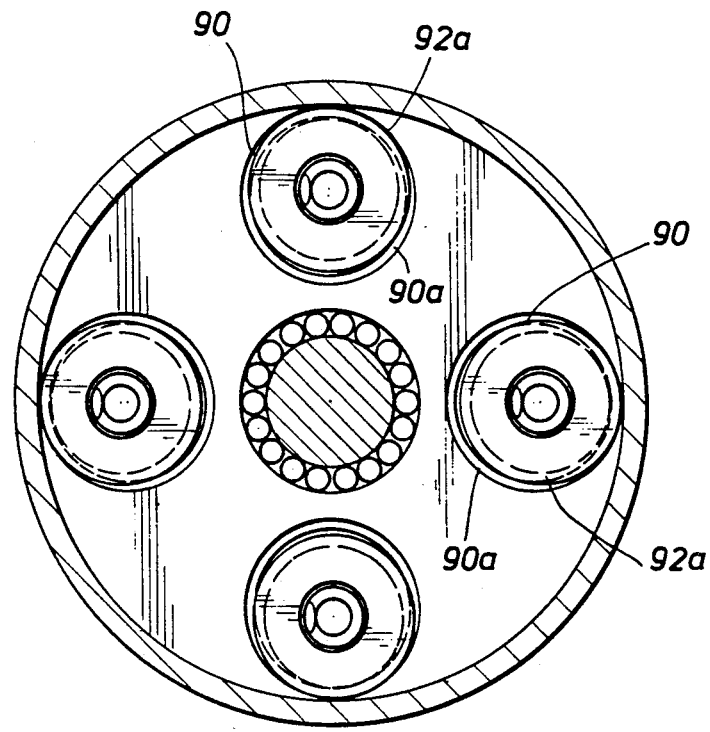
FIG. 5 is a view of the torque limiting device taken along line 5—5 of FIG. 4.

It is an important feature of this invention that once the detents are moved out of engagement with the indentations, they stay out of engagement until such time as the electric motor is shut off, and then return automatically to engagement with the indentations when the motor is started to again move the valve member to operative position. This is accomplished by mounting each body loosely within the hole 90 so that an upper outwardly extending flange 92a thereon having an upwardly and outwardly tapered bottom surface to move laterally over a tapered shoulder 90a on the upper end of the hole. The flanges are forced outwardly over the shoulders by centrifugal force when bodies are raised with the detents as the detents move out of the indentations. Centrifugal force will then hold the detents in the position shown in FIG. 4 well above plate 84 until the centrifugal force is removed at which time they are free to drop back into the indentations.

Figure 6:
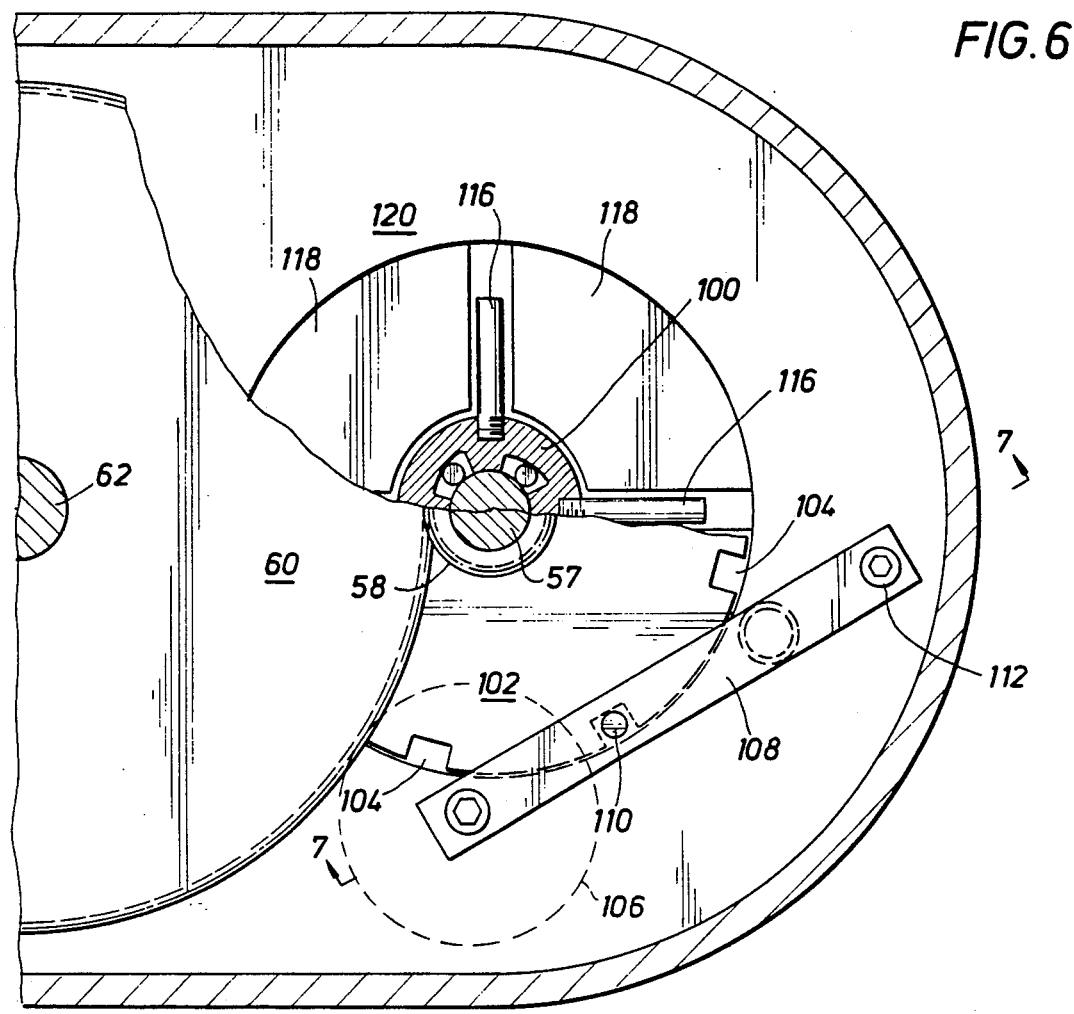
FIG. 6 is a top view of the centrifugal brake used in this embodiment to retard the movement of the valve stem back to its fail safe position and also showing the detent arrangement for holding the valve in operating position.
Figure 7:
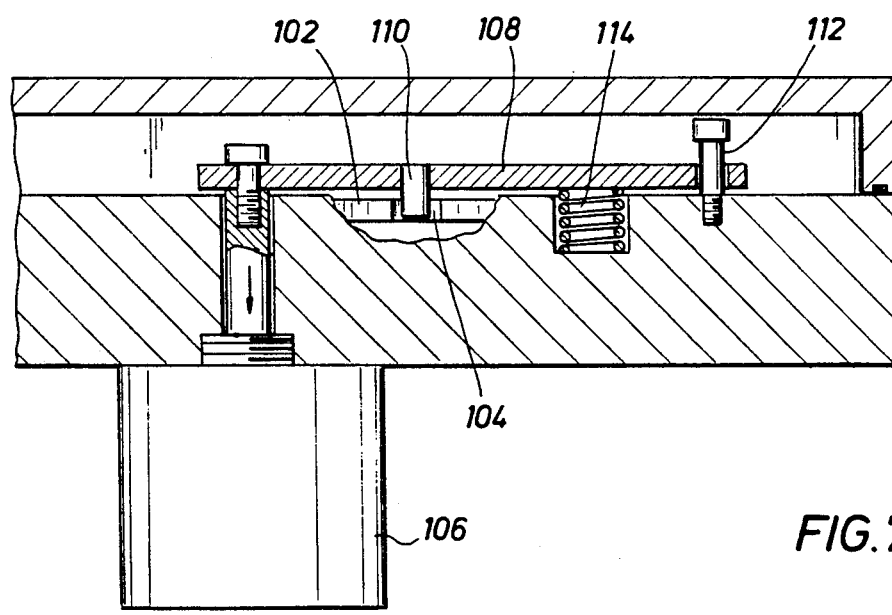
FIG. 7 is a view taken along line 7—7 of FIG. 6.

As shown in FIGS. 1, 6, and 7, the means for holding the valve stem in its operating position includes roller clutch 100 mounted on output shaft 57. As shown in FIG. 6, the roller clutch is attached to plate 102 which has a series of peripheral notches 104. When the electric motor is rotating to drive the ball nut, output shaft 57 will be free to rotate relative to roller clutch 100. Solenoid 106 is activated to continuously holds elongated strip 108 in the position shown in FIG. 7 with locking pin 110 in engagement with one of the notches 104 in the periphery of plate 102. When the valve stem hits positive stop sleeve 40 and the torque limiting device disconnects the electric motor, the direction of rotation of shaft 57 will reverse—i.e., counter-clockwise as seen in FIG. 6. With locking pin 110 in engagement with a notch in plate 102 holding the plate from rotating and roller clutch 100 holding the shaft from rotating, the valve stem is held in its operating position.

When power fails, plate 108 is forced upwardly by coil spring 114 and pin 110 is moved out of engagement with the notch. Shaft 57 will be rotated in the opposite direction by the upward travel of the valve stem and roller clutch 100 will rotate with the shaft. In doing so, the roller clutch will rotate pins 116 positioned between brake shoes 118 causing the brake shoes to rotate and to move outwardly into engagement with the inner wall of brake housing 120 due to centrifugal force. Engagement of the brake shoes with the brake housing, which is stationary, will dissipate a substantial portion of the energy and retard the movement of the valve stem to its fail safe position thereby preventing the rotation of the shaft of the electric motor at excessive speeds released by the spring that otherwise could damage the power train and the electric motor.

In operation, electric motor 50 rotates ball nut 20 through the centrifugal clutch and torque-limiting device so that the initial high torque output of the electric motor is not transmitted to the torque-limiting device until the electric motor gets up enough speed to engage the centrifugal clutch, at which time the torque output of the motor will have decreased to a level that can be tolerated by the torque-limiting device. When the valve stem has been moved to its operating position and is stopped by the engagement of disc 36 with the shims on top of sleeve 40, the electric motor will still be running. However, the sudden increase in torque will not be transmitted to the motor because the torque limiting device will disconnect the motor from the rest of the power train. Finally, when power fails, rapid movement of the valve stem to its fail safe position by the energy stored in the spring and the pressure in the valve is dissipated to a substantial degree by a centrifugal brake.

Handwheel 130 shown in FIG. 1 can be pushed downwardly against spring 132 into engagement with the upper end of shaft 62 to rotate the ball nut to move the valve stem to its operating position, if for some reason the electric motor is broken.

As in the embodiment above described, the actuator shown in FIGS. 8-17 is mounted on valve body 210 by connecting it to stuffing box housing 212 which is bolted to the body. C-clamp 214 attaches actuator housing 216 to stuffing box 212. Valve stem 218 extends through the stuffing box housing and has its lower portion 218a connected to a gate for moving the gate between open and closed positions as the valve stem is reciprocated. Upper portion 218b of the valve stem is provided with helical groove 219 that engages the balls in ball nut 229. Ball nut 220 is mounted for rotation in actuator housing 216 by tubular sleeve 222 that is connected to the top of the ball nut and is supported for rotation relative to the actuator housing by needle bearings 230. As will be described to follow, sleeve 222 also serves as a fly wheel in connection with a centrifugal brake.

Sleeve 222 has upwardly facing shoulder 222a and an inner plug 224 has downwardly facing shoulder 224a between which is located thrust bearing 226. Needle bearings 230 are located between the inner annular surface of lower plug member 224 and sleeve 222. Thrust bearing 226 resists or transfers the upward thrust of spring 228 to housing 216 through an upper plug 232. The spring 228 is positioned between bottom plate 231 of the housing and spring ring 233. Spring ring includes a central cylindrical cavity, the bottom of which has openings through which a reduced diameter section of the stem is located so that the upward force of the spring 228 will be transmitted to the valve stem.

Means to stop the downward travel of the valve stem when the valve reaches its operating position is structurally the same as in the embodiment described above and includes sleeve 240 positioned on top of stuffing box housing 212 to limit the downward movement of the valve stem. Shims 242 on top of the sleeve for the purpose of adjusting the stroke as explained above.

Ball nut 220 is rotated by electric motor 250 having an output shaft 254 connected to torque limiting device 256, the structure and operation of which will be described later. Output shaft 257 of the torque limiting device rotates pinion 258 and extends through one-way clutch 259 which is in essence a roller bearing commonly called a sprague clutch that will allow the shaft to rotate in one direction only. The upper end of shaft 257 is supported for rotation by bearing 260.

Figure 9:
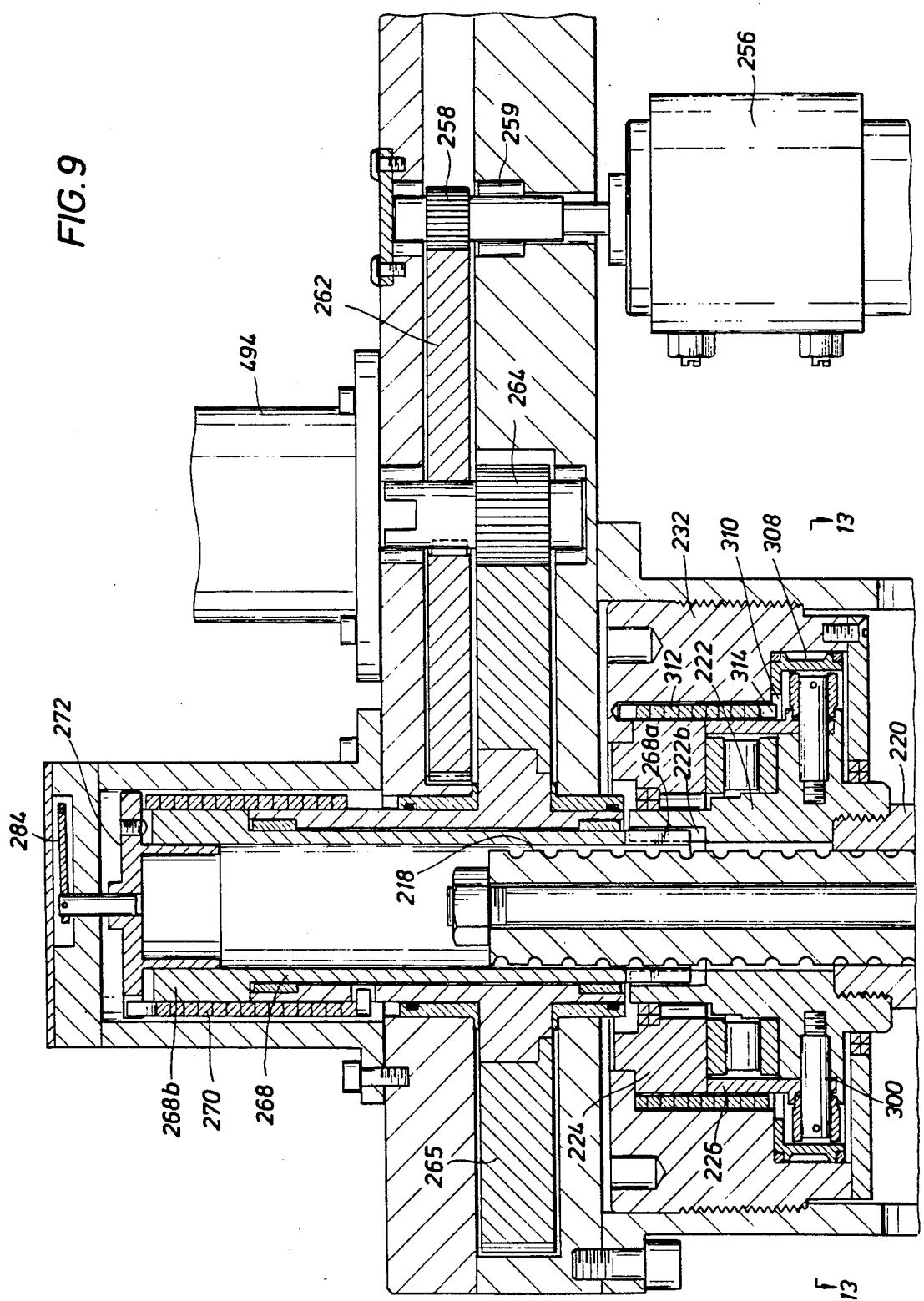
FIG. 9 is a sectional view on an enlarged scale of the upper portion of the actuator shown in FIG. 8.

Pinion 258 rotates gear 262 which rotates shaft 263 and in turn pinion 264. Pinion 264 rotates gear 265 and outer drive sleeve 266. Inner drive sleeve 268 is supported on the outer and drive sleeve and extends downwardly through it. As best shown in FIG. 9, the lower end of the inner drive sleeve has downwardly extending lugs 268a located 180° apart which extend into slots 222b in the top of fly wheel sleeve 222. The upper end of inner drive sleeve 268 has a portion 268b having an outside diameter equal to the outside diameter portion of outer drive sleeve 266 both of which portions are surrounded by a wrap spring clutch 270.

Figure 10:
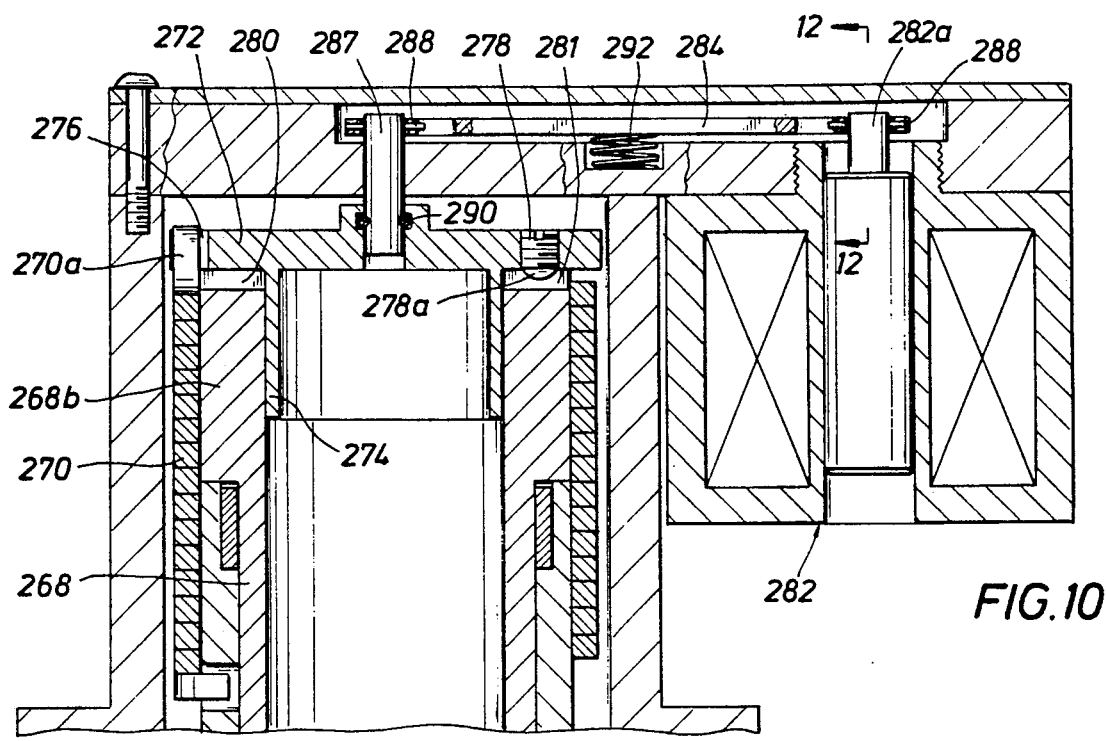
FIG. 10 is a sectional view on an enlarged scale of the wrap spring clutch used to transmit torque from the motor to the ball nut and the apparatus for actuating the clutch.
Figure 11:
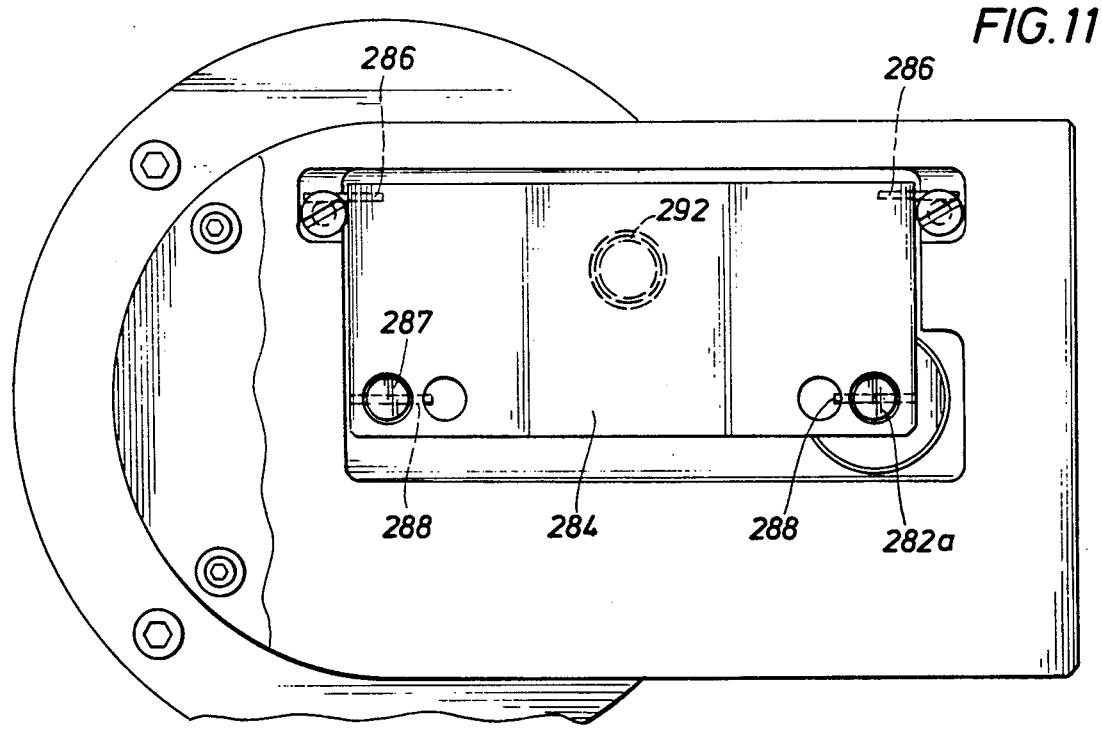
FIG. 11 is a top view of the apparatus of FIG. 10 with the top cover plate removed.
Figure 12:
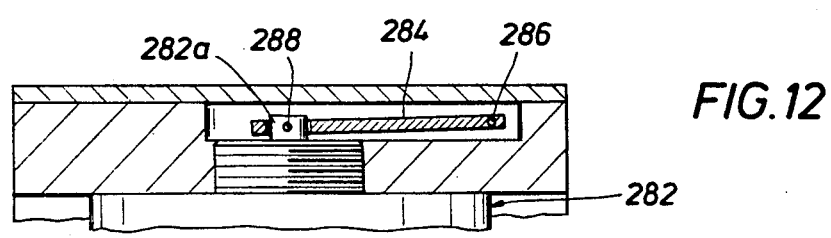
FIG. 12 is a sectional view taken along line 12—12 of FIG. 10.

When actuated, wrap spring clutch 270 causes the outer drive sleeve rotated by the electric motor to transmit torque to the inner drive sleeve and thus move the valve to its operating position. Thus, as best seen in FIGS. 10 and 11, actuating disc 272 is mounted above the upper end of inner drive sleeve 268 by a guide sleeve 274 on actuating disc 272 which extends downwardly therefrom into the open end of inner drive sleeve. Slot 276 on one side of the disc receives tang 270A on the upper end of wrap spring 270. On the other side of disc 272 is located threaded member 278 that has a curved or hemispherically shaped end 278a that extends into one of two slots 280 and 281 in the upper end of inner drive sleeve 268.

With the hemispherical end of threaded member 278 in engagement with groove 281, disc 272 will rotate with wrap spring 270 because of the engagement of tang 270a with slot 276. The spring is arranged so that rotation of the disc will cause the spring to tighten its grip on the outer surfaces of inner and outer drive sleeves and thus transmit torque from the outer drive sleeve to the inner drive sleeve which in turn will rotate member 222 and ball nut 220 and move the valve to its operating position, at which time electric motor 250 may be turned off.

At this point, spring 228 will be continuing to exert an upward force on the valve stem. However, as long as disc 272 remains in the position shown in FIGS. 8, 9, and 10, the valve will remain in its operating position. The upward force will create a torque that is transmitted back to gear 265 and from that gear back to pinion 258. Nothing will rotate, however, because spring clutch 259 will resist any rotation of shaft 257 in the direction that the spring force will want to rotate this shaft.

Disc 272 is moved to its lower position shown in FIG. 10 to engage the end of the wrap spring by means of solenoid 282. The armature 282A of the solenoid is connected to one corner of one side of a plate 284 by pin 288, and the opposite corner of the one side of the plate is connected by pin 228A to the upper end of stub shaft 287. The stub shaft extends through the top wall of the housing to connect by pins 290 to a hole in the upper end of disc 272, whereby the disc is raised or lowered with the plate. The plate pivots about pins 286 connecting its corner on its upper side to the housing. Coil spring 292 urges plate 284 upwardly to pivot around hinge pin 287A and move stub shaft 287 upwardly to lift disc 272 to a position where pin 278A is above the upper end of the inner drive sleeve 268. In this position, the disc, even though still in engagement with tang 270A will not actuate the wrap spring clutch. When the solenoid is energized, however, it will lower plate 284 to move the disc to the position shown in FIG. 10 whereby the clutch will move the valve to its operating position by the electric motor.

Deenergizing solenoid allows the disc to be moved upwardly to permit the inner sleeve 268 to rotate. When that happens, the valve stem is free to move upwardly through the ball nut, which offers very little resistance. As in the first embodiment, however, a centrifugal brake is provided in this embodiment to dissipate the energy and thus slow down the upward movement of the valve stem.

Figure 8:
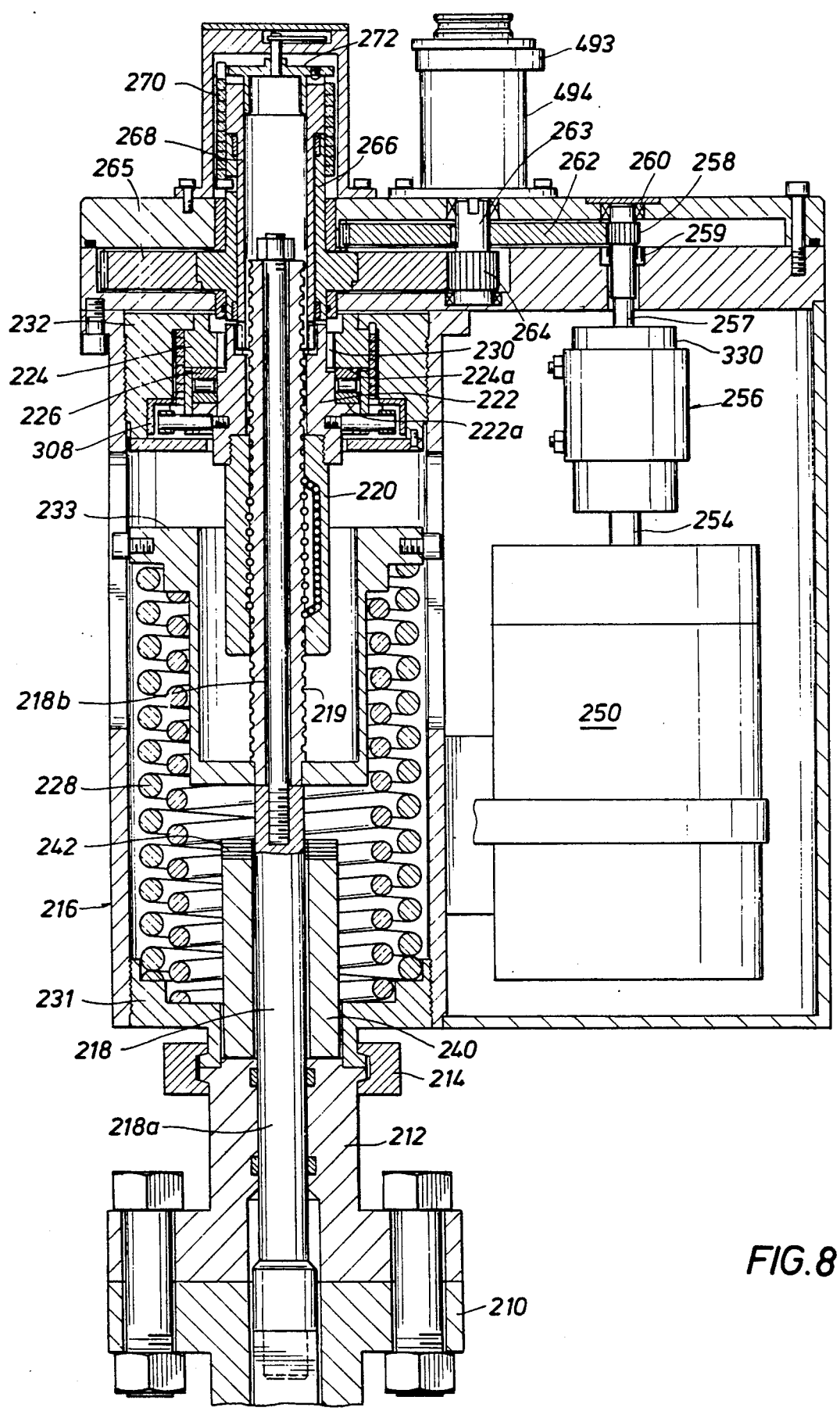
FIG. 8 is a view, partly in section and partly in elevation, of another embodiment of the actuator of this invention.
Figure 13:
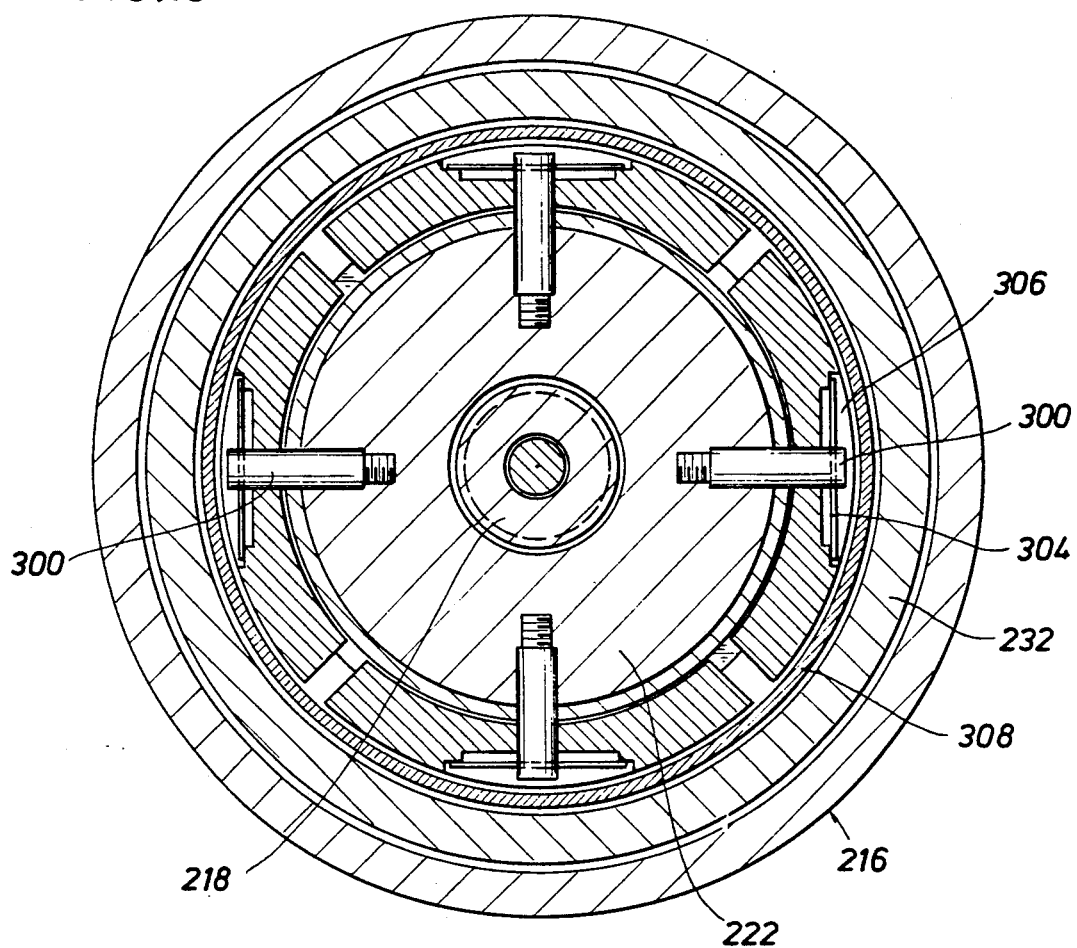
FIG. 13 is a sectional view taken along line 13—13 of FIG. 9 showing a centrifugal brake used to slow the upward movement of the valve stem when the power is shut off.
Figure 14:
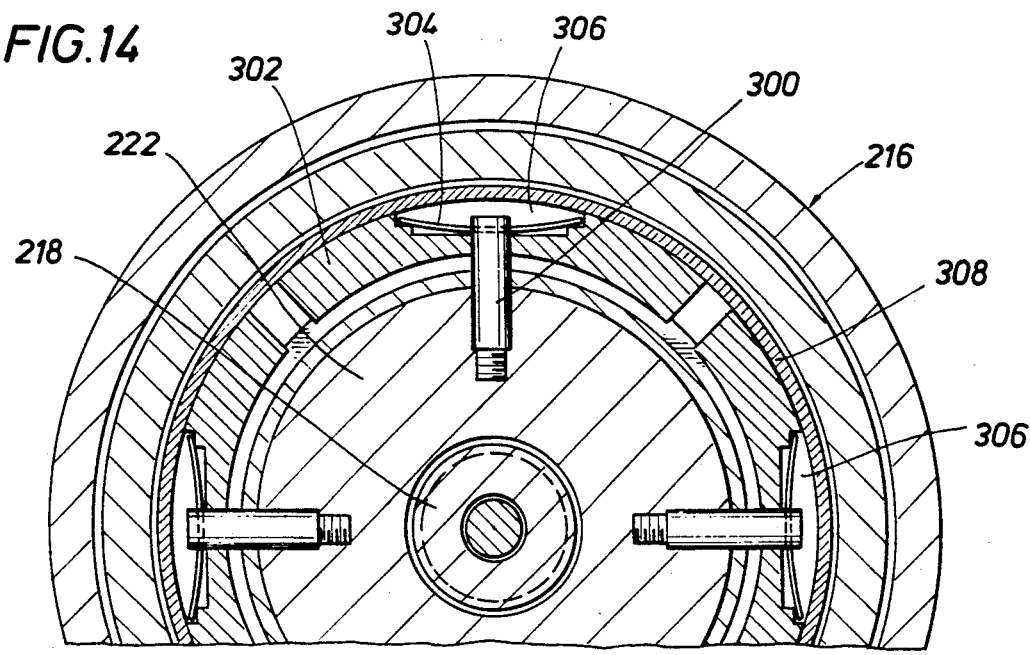
FIG. 14 is a view of the centrifugal brake with the brake shoes in engagement with the brake drum.

Thus, as shown in FIGS. 13 and 14, the brake includes a plurality of pins 300 that mount brake shoes 302 around the outer periphery of fly wheel member 222. The shoes are attached to the pins by spring wires 304 that extend within holes in the outer ends of the pins and span cavities 306 in the shoes. In operation, the spring forces the valve stem through ball nut 220, fly wheel 222 is rotated to cause brake shoes 302 to move outwardly into engagement with brake housing 308 due to centrifugal force against the holding action of wire springs 304. As best shown in FIGS. 8 and 9, brake housing 308 is disposed within upper plug 232 and includes slots 310 into which tang 314 of a wrap spring clutch 312 extends, whereby the housing moves with the brake shoes to cause the spring to wrap tightly against the outer surface of inner plug 224 and annular member 226 to therefore act as a brake and slow the speed of rotation of the fly wheel 222.

The construction of torque limiting device 256 is shown in FIGS. 15 and 16 and includes hub 330 having opening 232 to receive output shaft 254 from the electric motor. Set screw 356 holds the hub from moving longitudinally in opening 332 and key 358 ensures that the hub and the output shaft rotate together. Output shaft 257 includes a cylindrical section 362 of reduced diameter supported for rotation by bearings 364 mounted within the hub as well as further reduced diameter sections 368 and 360, which are also cylindrical but eccentric to the axis of the upper end of the shaft. The lowermost section 360 is surrounded by bearing 366 mounted within the hub, and bearing 372 surrounds and is mounted on the intermediate section. A ring 370 surrounds and is supported by bearing 372 opposite the inner end of a follower pin 374 which extends through a hole in the outer wall of hub 330 and is held in engagement with the outer surface of ring 370 by C-shaped spring 376 which is mounted above the hub. The spring is designed to hold ring 370 from rotating relative to hub 330 and thus rotate the output shaft with the hub on the input shaft until such time as the torque is sufficient to force pin 374 outwardly against the resistance of C-shaped spring 376 with sufficient force to spread the spring and thus allow the hub to rotate past the throw of the eccentrically mounted ring and continue to do so as long as the torque remains sufficiently high.

Thus, upon start up of the motor to move the valve member to its operating position, the hub 330 and spring 376 will rotate with the output shaft 254 in a clockwise direction, as shown in FIG. 16, until the pin reaches a point opposite the ring 370 on the output shaft in which it is so tightly engaged at both ends as to rotate the ring with the hub. However, when the valve member is stopped at its operating position, the resulting torque will overcome this force and thus push the pin outwardly to expand the spring in order to permit the maximum throw of the eccentric to move past the pin and thus disconnect the motor.

If for some reason the electric motor 250 is not operating, and it is necessary to manually move the valve member to operating position, solenoid 282 will need to actuate wrap spring clutch 270. Alternatively, if the solenoid is not operating, it will be necessary to move the top plate from the housing and manually move disc 272 (FIG. 8) downwardly to engage the clutch.

At the same time, the handwheel 480 shown in FIGS. 17 and 17A may be moved to a position for rotatably engaging shaft 263 on pinion 264. Thus, the handwheel is connected by a pin 484 to a stem 482 which is mounted by ball bearings 492 for rotation within a housing 494 on the top of the actuator in axial alignment with the shaft 263. A tongue 486 on the lower end of the stem is normally held above a groove 488 on the supper end of the shaft by a coil spring 490. However, when the handwheel is forced downwardly against the spring, the tongue engages in the groove to permit the shaft 263 to be rotated by the handwheel, and thus rotate pinion 264 and gear 285 to rotate drive sleeve 266 and thus the ball nut. Once in operating position, the valve member will be held in that position by sprague clutch 259 as long as the wrap spring clutch is actuated so that torque is transmitted between the inner and outer drive sleeve.

The housing 494 comprises an upper section 494A pinned to the stem and vertically shiftable with respect to a lower section 494B mounted on the actuator. The stem 482 is normally held in its upper, disengaged position by means of a disc 493 which has a hole which surrounds the stem and extends between the housing sections for shifting between the positions of FIGS. 17 and 17A. When in the position of FIG. 17, the disc holds the section 494A in its upper position to hold the stem disengaged. However, when the disc is shifted to the left, as shown in FIG. 17A, a recess 493A in its lower side is above the upper end of housing 494B to permit the stem to be lowered to its engaged position.

The disc is normally held in its position locking out the stem by means of a spring 496 between one side of the hole in the disc and a hole in the side of the stem. Thus, in order to engage the stem, it is necessary to grip and force the disc to the left and then push the handwheel down. Thus, upon release of the disc and the handwheel, the handwheel is automatically raised by spring 490 and then locked out by the disc. This then prevents the handwheel from being either inadvertently engaged or left in engagement.

The torque limiting device shown in FIGS. 18 to 21 comprises first, second and third bodies 501, 502 and 503 arranged coaxially of one another and adapted for relative rotation with respect to one another. The first body 501 has a socket 501A therein to permit it to be releasably connected to an input shaft IS, which may be the output shaft of the electric motor, and the body 503 has a groove 503A in its upper end to permit it to be releasably connected to an output shaft (not shown) which in turn may be connected to a gear train for rotating the ball nut and thus moving the valve member to operating position.

The second body 502 has an opening 504 through it adapted to fit closely over an upper reduced diameter extension 505 of the first housing with a shoulder about its lower end supported on the upper end of the first body and reduced portion of its lower end fitting within the open upper end of the first body. A lower reduced diameter portion 506 of the third body 503 is supported on the upper end of the second body, and a further reduced diameter portion 507 on the upper end of the first body 501 is surrounded by ball bearings 508 which are held between the upper ends of the second housing 502 and the reduced portion 505 of the first body and the upper end of a recess 509 in the lower end of the third body 503.

A reduced diameter portion 510 at the upper end of the second body 502 forms a smooth continuation of the reduced diameter portion 506 at the lower end of the third body 503. A wrap spring clutch 511 is disposed closely about such portions with its upper free end held within a hole 512 in the side of the reduced portion, and the lower free end of the spring is disposed just above slot 513 formed in the side of the lower end of the second member 502 and thus above one side of the enlarged diameter portion of the first body 501.

Figure 18:
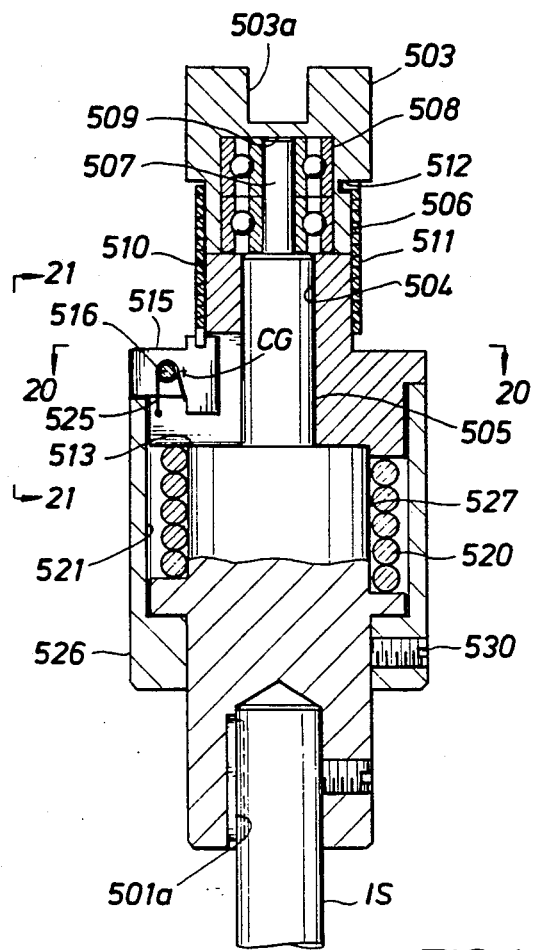
FIG. 18 is a vertical sectional view, partly in elevation of still another embodiment of a torque limiting device which may be used in either embodiment of the actuator, with the parts of the device in torque transmitting position.
Figure 19:
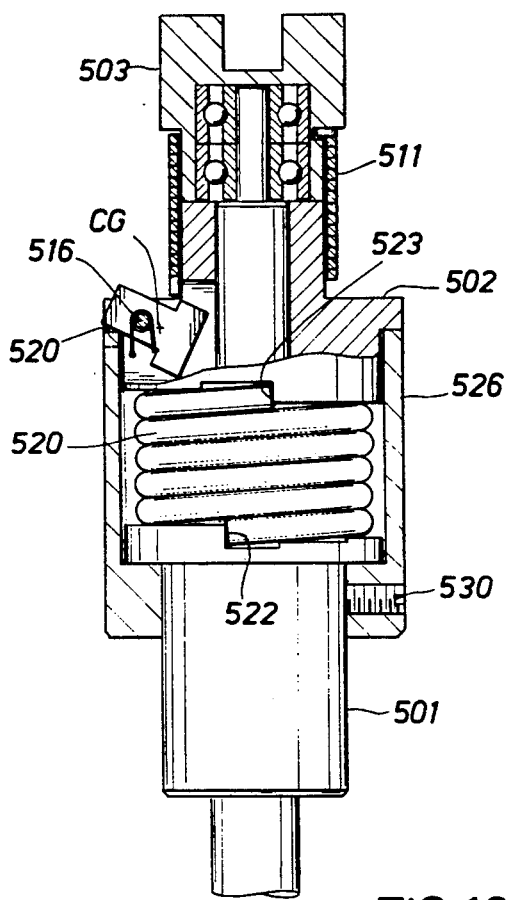
FIG. 19 is a view similar to FIG. 18, but with the device in a position to disconnect the input shaft of the motor from the output shaft.
Figure 20:
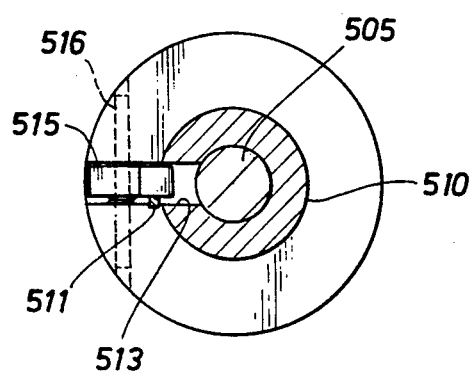
FIG. 20 is a cross-sectional view of the device as seen along broken lines 20—20 of FIG. 18.
Figure 21:
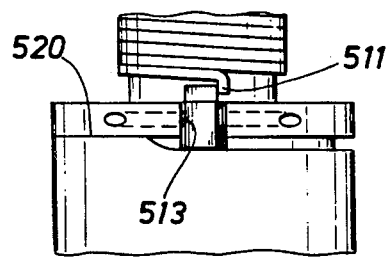
FIG. 21 is a partial size view of the device, as seen from the broken lines 21—21 of FIG. 18.

The lower end of the wrap spring is adapted to be held by means of A key 515 which is pivotally mounted in the slot by means of a pin 516 extending through the second body, as best shown in FIG. 20, for movement between the positions of FIGS. 18 and 19. When the key is in the position of FIG. 18, it engages the lower end of the wrap spring clutch so that rotation of the second body 502 in one directional sense will tighten the wrap spring clutch about the outer diameter portions of the second and third bodies to cause them to rotate with one another. Alternatively, when the key is moved to its position of FIG. 19, it releases the lower end of the wrap spring clutch to permit the clutch to expand and thus permit the third body to rotate with respect to the second body. The key is caused to move between its alternate positions in a manner to be described to follow.

The second body 502 is caused to rotate with the first body by means of a relatively heavy coil spring 520 which is received within an annular space 521 within the first body and adapted to engage at its opposite ends with a shoulder 522 formed on the first body and a shoulder 523 formed on the lower side of the second body. More particularly, the spring is wound in a direction which resists expansion as the first body 501 is rotated clockwise with respect to the second body as viewed from the lower end of the device. Despite its strength, however, the spring will yield and thus expand to permit relative rotation of the two bodies with respect to one another when the second body encounters a predetermined amount of torque tending to rotate it in a counterclockwise direction.

As the coil spring expands, and the first body 501 begins to rotate with respect to the second body 502, the outer end of key 515 will rotate into a position in which it will engage a cam surface 520 on an upper edge of the first body to swing the key to its releasing position shown in FIG. 19. As previously mentioned, when the key is moved to this position, it releases the lower end of the wrap spring clutch 511, which in turn permits the second and third bodies to rotate relatively with respect to one another.

Thus, when the motor is started to rotate the input shaft IS, and thus the first body 501, the coil spring 520 will initially rotate the second body from the position of FIG. 2 to move the key 515 into position to hold the end of the wrap spring clutch. Continued rotation of the second body will thus rotate the second body with respect to the third body to tighten the wrap spring clutch and rotate the third body with the second body, and thereby rotate the ball nut to start moving the valve member to its operating position.

When the valve member is moved to its operating position, and engages a stop to prevent further downward movement, the greatly increased torque transmitted back to the body 503 and thus to the body 502 will loosen the wrap spring 510 sufficiently to permit the cam 520 to move the key 515 to the releasing position of FIG. 19, thus permitting the body 503 to rotate with respect to the second body 502 which disconnects the body 501 from rotation with the high torque transmitting body 503.

The key is normally urged toward its holding position of FIG. 18 by means of a torsion spring 525 held at its opposite ends between the key and the slot in the second body. The pivot axis of the pin 516 is disposed to the left of the center of gravity CG of the key such that the center of gravity moves to a position below the level of the pivot axis when the key is cammed to its releasing position of FIG. 19. Hence, even though the second body continues to rotate with the first body, such that the cam 520 is moved out from under the outer end of the key 515, the centrifugal force on the key during rotation of the second body will maintain it in its releasing position. When, however, the motor is shut off to stop rotation of the first body 501, and thus the second body 502, the key will be returned by spring 525 to the position shown in FIG. 18 at which time it rests on the upper edge of the first body to the side of the cam surface 520 to hold it in position to hold the lower end of the spring.

The first body comprises an outer tubular section 526 which surrounds the upper end of an inner section 527 to form the space 521 to receive the coil spring. The cam surface is formed on the upper edge of the outer body section, and the shoulder 522 is formed on a lower flange of the inner section which supports the lower end of the spring. The first body sections are releasably held in a desired rotative position with respect to one another by means of a set screw 530, so that the angular position of the sections may be adjusted to control location of the cam 520 with respect to the key 515 and thus the degree to which the coil spring will resist torque before releasing the wrap spring clutch. Obviously, increasing the space between the cam surface and key increases the amount of torque necessary to move the cam to a releasing position.

From the foregoing it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matter herein set forth or shown in the accompanying drawings is to be interpreted as illustrative and not in a limiting sense.

What is claimed is:

1. A fail safe valve actuator comprising a housing for mounting on a valve body, a valve stem having one portion adapted to be connected to the valve member of a valve and another portion having an elongated helical groove in its outer surface, means mounting the valve stem in the housing to reciprocate and thereby move the valve member between valve open and valve closed positions, compressible means for urging the valve stem toward one position, means for moving the valve member to its other position including a ball nut in engagement with the helical groove on the valve stem and mounted in the housing for rotation relative to the valve stem, an electric motor having an output shaft, a centrifugal clutch connected to the output shaft of the electric motor that will engage and transmit torque when the motor reaches a preselected speed of rotation, means for transmitting the torque from the centrifugal clutch to the ball nut to rotate the nut and move the valve stem and valve member to one position, and electrically powered means for holding the stem and valve member in said one position and then releasing the valve stem and valve member for movement by the compressible means to the other position when the electrical power fails.

2. The fail safe valve actuator of claim 1 in which the means for transmitting the torque from the centrifugal clutch to the ball nut includes a torque limiting device that will disconnect the centrifugal clutch from the ball nut when the valve member reaches the other position and the output torque of the electric motor increases to a preselected amount.

3. The fail safe valve of claims 1 or 2 in which the torque transmitting means includes an output shaft, a roller clutch on the shaft, a centrifugal brake having a cylindrical shell, and a plurality of brake shoes positioned between the roller clutch and the shell for rotation with the roller clutch, said roller clutch allowing free rotation of the shaft when moving the valve stem to the one position while rotating the brake shoes when the output shaft rotates in the other direction causes the brake shoes to engage the shell and retard the speed of rotation of the output shaft when the compressible means is urging the valve stem to the other position.

4. The fail safe actuator of claim 2 in which the torque limiting device includes a body rotated by the electric motor around its central axis, said body having a plurality of holes spaced from the central axis, an output shaft, a plate attached to the output shaft for rotation therewith and positioned with one side facing the holes in the body, said plate having a plurality of indentations spaced from its axis of rotation to move along the same general circular path as the holes in the body, and detent means located in the holes for engaging the indentations in the plate and rotating the plate and the output shaft with the body, resilient means for holding the detents in engagement with the indentations and for allowing the detents to move out of engagement with the indentations when the torque reaches a predetermined amount to allow the body to rotate free of the plate and the output shaft, and means to hold the detents out of engagement until the electric motor is turned off.

5. The fail safe actuator of claim 2, wherein the torque limiting device includes a drive shaft connectible to the centrifugal clutch and a driven shaft connectible to the ball nut, one of the shafts having a cylindrical inner portion mounted within a cylindrical portion of the other shaft for relative rotation with respect thereto about an axis which is eccentric to the axis of rotation of the other shaft, a pin carried by the cylindrical outer portion for radial movement with respect thereto, and means yieldably holding the inner end of the pin engaged with the inner portion to allow the drive shaft to rotate the driven shaft until the torque transmitted between them overcomes the yieldable holding means to allow the inner portion of the one shaft portion to rotate relative to the outer portion of the other shaft.

6. The fail safe valve of claim 5, wherein said yieldable holding means comprises a C-spring disposed about the outer cylindrical portion to engage the outer end of the pin.

7. The fail safe valve of claim 2, wherein the torque limiting device comprises first, second and third coaxially disposed and relatively rotatable bodies, one of said first and third bodies being rotated by the centrifugal clutch and the other of the first and third bodies rotating the bolt nut, a wrap spring clutch surrounding portions of the second and third bodies and held at one end by the third body, a coil spring held at its ends between oppositely facing shoulders of the first and second bodies so as to transmit rotation therebetween in one directional sense while yieldably resisting relative rotation therebetween in the opposite directional sense, detent means mounted on the second body for movement between a first, normally assumed position holding the opposite end of the wrap spring clutch so that the third body is rotated with the second body to tighten the wrap spring clutch about said portions of the second and third bodies and thus cause the shafts to rotate with one another in response to rotation of said second body in said one directional sense, rotation to the output shaft, and a second position releasing said opposite end of the wrap spring clutch to permit said third body to rotate relatively to the second body, and means responsive to a predetermined amount of torsion applied to the coil spring, through rotation of the second body in said opposite directional sense with respect to said first body, for moving the holding means to its second position, said holding means remaining in its second position until rotation of said first body is stopped.

8. A fail safe valve actuator comprising a housing for mounting on a valve body, a valve stem having one portion adapted to be connected to the valve member of a valve and another portion having an elongated helical groove in its outer surface, means mounting the valve stem in the housing to reciprocate and thereby move the valve member between valve open and valve closed positions, compressible means for urging the valve stem toward one position, means for moving the valve stem to its other position including a ball nut in engagement with the helical groove on the valve stem and mounted in the housing for rotation relative to the valve stem, an electric motor having an output shaft, means for transmitting the torque from the electric motor to the ball nut to rotate the nut and move the valve stem and valve member to one position, including a torque limiting device to disconnect the electric motor from the torque transmitting means when the torque reaches a preselected amount, and electrically powered means for holding the stem and valve member in said one position and then releasing the valve stem and valve member for movement by the compressible means to the other position when the electrical power fails.

9. The fail safe valve actuator of claim 8 in which the means for transmitting the torque from the motor to the ball nut includes a centrifugal clutch that will engage and transmit torque when the motor reaches a given speed of rotation.

10. The fail safe valve of claim 8 in which the torque transmitting means includes an output shaft, a roller clutch on the shaft, a centrifugal brake having an outer cylindrical shell on the housing, and a plurality of brake shoes positioned between the roller clutch and the shell for rotation with the roller clutch, said roller clutch allowing free rotation of the output shaft when moving the valve stem to the one position while rotating the brake shoes when the output shaft rotates in the other direction causing the brake shoes to engage the housing and retard the speed of rotation of the output shaft when the compressible means is urging the valve stem to the other position.

11. The fail safe actuator of claim 8 in which the torque limiting device includes a body rotated by the electric motor around its central axis, said body having a plurality of holes spaced from the central axis, an output shaft, a plate attached to the output shaft for rotation therewith and positioned with one side facing the holes in the body, said plate having a plurality of indentations spaced from its axis of rotation to move along the same general circular path as the holes in the body, and detent means located in the holes for engaging the indentations in the plate and rotating the plate and the output shaft with the body, resilient means for holding the detents in engagement with the indentations and for allowing the detents to move out of engagement with the indentations when the torque reaches a predetermined amount to allow the body to rotate free of the plate and the output shaft and means to hold the detents out of engagement until the electric motor is turned off.

12. The fail safe actuator of claim 8, wherein the torque limiting device includes a drive shaft rotatable by the electric motor and a driven shaft for rotating the ball nut, one of the shafts having a cylindrical inner portion mounted within a cylindrical portion of the other shaft for relative rotation with respect thereto about an axis which is eccentric to the axis of rotation of the other shaft, a pin carried by the cylindrical outer portion for radial movement with respect thereto, and means yieldably holding the inner end of the pin engaged with the inner portion to allow the drive shaft to rotate the driven shaft until the torque transmitted between them overcomes the yieldable holding means to allow the inner portion of the one shaft portion to rotate relative to the outer portion of the other shaft.

13. The fail safe actuator of claim 12, wherein said yieldable holding means comprises a C-spring disposed about the outer cylindrical portion to engage the outer end of the pin.

14. The fail safe actuator of claim 8, wherein the torque limiting device comprises first, second and third coaxially disposed and relatively rotatable bodies, one of said first and third bodies being rotated by the electrical motor and the other of the first and third bodies rotating the bolt nut, a wrap spring clutch surrounding portions of the second and third bodies and held at one end by the third body, a coil spring held at its ends between oppositely facing shoulders of the first and second bodies so as to transmit rotation therebetween in one directional sense while yieldably resisting relative rotation therebetween in the opposite directional sense, detent means mounted on the second body for movement between a first, normally assumed position holding the opposite end of the wrap spring clutch so that the third body is rotated with the second body to tighten the wrap spring clutch about said portions of the second and third bodies and thus cause the shafts to rotate with one another in response to rotation of said second body in said one directional sense, and a second position releasing said opposite end of the wrap spring clutch to permit said third body to rotate relatively to the second body, and means responsive to a predetermined amount of torsion applied to the coil spring, through rotation of the second body in said opposite directional sense with respect to said first body, for moving the holding means to its second position, said holding means remaining in its second position until rotation of said first body is stopped.

15. The fail safe valve of claim 8 in which the means for transmitting the torque from the electric motor to the ball nut includes a drive shaft, a gear train connected to the output shaft of the electric motor and the drive shaft to transmit torque from the electric motor to the drive shaft to rotate the drive shaft, a driven shaft connected to the ball nut, and an electrically operated clutch for connecting the drive shaft to the driven shaft to allow the electric motor to rotate the ball nut.

16. The fail safe valve actuator of claims 8 in which the means for holding the stem and valve member in said position includes a one-way clutch for holding the output shaft of the electric motor from rotating in a direction opposite the direction it rotated when driving the ball nut to move the valve member to said one position as long as the clutch is engaged.

17. The fail safe valve operator of claim 8 further provided with brake means for controlling the speed of rotation of the ball nut when the holding means of the valve is released and the resilient means is moving the valve member to its other position.

18. The fail safe valve operator of claim 17 in which the brake means includes a plurality of brake shoes carried by the driven shaft, resilient means resisting the outward movement of the brake shoes due to centrifugal force as the driven shaft and ball nut are rotated by the moving valve stem, and clutch means that is engaged by the outward movement of the brake shoes to slow the rotation of the driven shaft.

19. The fail safe valve operator of claim 18 in which the clutch includes a wrap spring that will grip the housing and the driven shaft and slow the rotation of the ball nut when actuated by the outward movement of the brake shoes.

20. A fail safe valve actuator comprising a housing for mounting on a valve body, a valve stem having one portion adapted to be connected to a valve member of the valve and another portion having an elongated helical groove in its outer surface, means mounting the valve stem in the housing to reciprocate and thereby move the valve member between valve open and valve closed positions, compressible means for urging the valve stem toward one position, means for moving the valve stem to its other position including a ball nut in the housing in engagement with the helical groove on the valve stem and mounted in the housing for rotation relative to the valve stem, an electric motor having an output shaft, a centrifugal clutch connected to the output shaft of the electric motor that will engage and transmit torque when the motor reaches a preselected speed of rotation, means for transmitting the torque from the centrifugal clutch to the ball nut to rotate the nut and move the valve stem and valve member to one position including a torque limiting device that will disconnect the centrifugal clutch from the ball nut when the torque reaches a preselected amount, electrically powered means for holding the stem and valve member in one position and then releasing the valve stem and valve member for movement by the compressible means to the other position when the electrical power fails.

21. The fail safe valve of claim 20 in which the torque transmitting means includes a shaft and is further provided with a roller clutch on the shaft, a centrifugal brake having an outer cylindrical shell on the housing, and a plurality of brake shoes positioned between the roller clutch and the shell for rotation with the roller clutch, said roller clutch allowing free rotation of the output shaft when moving the valve stem to the one position while rotating the brake shoes when the output shaft rotates in the other direction causing the brake shoes to engage the shell and retard the speed of rotation of the output shaft when the compressible means is urging the valve stem to the other position.

22. The fail safe actuator of claim 20 in which the torque limiting device includes a body rotated by the electric motor around its central axis, said body having a plurality of holes spaced from the central axis, an output shaft, a plate attached to the output shaft for rotation therewith and positioned with one side facing the holes in the body, said plate having a plurality of indentations spaced from its axis of rotation to move along the same general circular path as the holes in the body and detent means located in the holes for engaging the indentations in the plate and rotating the plate and the output shaft with the body, resilient means for holding the detents in engagement with the indentations and for allowing the detents to move out of engagement with the indentations when the torque reaches a predetermined amount to allow the body to rotate free of the plate and the output shaft, and means to hold the detents out of engagement until the electric motor is turned off.

23. An actuator for a valve having a body and a closure member movable between alternate positions within the body, comprising
  a housing for mounting on the valve body,
  a reversible drive mechanism comprising a first drive part supported for rotation in the housing and a second drive part engageable with the first drive part, and connectible to the closure member for moving it to one of its positions upon rotation of the first part in one direction,
  an electric motor for rotating the first drive part in one direction,
  means yieldably urging the second drive part in a direction to move the closure member to its other position,
  electrically powered means for preventing said first drive part from rotating in said opposite direction and thus holding the closure member in its one position,
  means for releasing said rotation preventing means to permit said closure member to be moved by said urging means to its other position in response to the loss of the supply of electrical power to said rotation preventing means, and
  a torque limiting device for disconnecting the motor shaft and said first drive part in response to the transmission of a predetermined torque therebetween.

24. An actuator of the character defined in claim 23, including
  means for rotating first drive part in said one direction in response to rotation of the motor shaft but enabling said first drive part to rotate in the opposite direction without rotating the motor shaft.

25. An actuator of the character defined in claim 23, wherein
  the valve is a gate valve and the gate has a rising stem to which the second drive part is connectible, and
  means are provided for dissipating the energy due to fluid pressure in the valve body acting over the stem and the means with which said other drive part is urged to its other position upon release of said rotating preventing means.

26. An actuator of the character defined in claim 25, including
  means rotating first drive part in said one direction in response to rotation of the motor shaft but enabling said first drive part to rotate in the opposite direction without rotating the motor shaft.

27. An actuator of the character defined in claim 23, wherein
  said rotation preventing means comprises
  a first member having a first cylindrical surface which is rotatable with the first drive part,
  a second member having a second cylindrical surface aligned with the first cylindrical surface of the first member and rotatable in response to the rotation of motor shaft, a wrap spring surrounding the first and second cylindrical surfaces with one end connected to the second member, and stop means engageable with the other end for causing the spring to be wrapped tightly about the surfaces to rotate the first member with the second member, and said releasing means comprises means for removing said stop means to permit the spring to expand and thus permit said first member to rotate relative to said second member.

28. An actuator of the character defined in claim 23, wherein one of said drive parts is a nut having helical grooves therein, the other drive part is a screw having helical grooves thereabout and extending through the nut, and anti-friction elements are disposed between them for rolling within the helical grooves of both.

29. An actuator for a gate valve having a body and a rising stem for moving the gate between alternate positions within the body, comprising a housing for mounting on the valve body, a reversible drive comprising a first drive part supported for rotation in the housing and a second drive part engageable with the first drive part and connectible to the stem for moving the gate to one of its positions upon rotation of the first part in one direction, an electric motor for rotating the first drive part in one direction, means yieldably urging the second drive part in a direction to move gate to its other position, electrically powered means for preventing said drive part from rotating in said opposite direction and thus holding the gate in its one position, means for releasing aid rotation preventing means to permit said gate to be moved by said urging means to its other position in response to the loss of the supply of electrical power to said rotation preventing means and means which is independent of the rotation preventing means for dissipating the energy due to line fluid in the valve body acting over the stem and the means with which said second drive part is urged to its other position upon release of said rotating preventing means in proportion to the velocity with which said second part is moved toward its other position.

30. An actuator of the character defined in claim 29, wherein the energy dissipating means includes a brake housing, a plurality of brake shoes carried by the second drive part for rotation within a brake housing, resilient means resisting the outward movement of the brake shoes due to centrifugal force as the second drive part is rotated with the first drive part, and means engageable responsive to outward movement of the brake shoes against the brake housing for slowing the rotation of the second drive part.

31. An actuator of the character defined in claim 30, wherein the means for slowing rotation of the second drive part includes a spring wrapped about aligned cylindrical surfaces of the brake housing and the second drive part and adapted to be tightened thereabout to slow rotation of the first drive part in response to rotation of the brake housing with the shoes.

32. An actuator of the character defined in 30, wherein said rotation preventing means comprises a first member having a first cylindrical surface which is rotatable with the first drive part, a second member having a second cylindrical surface aligned with the first cylindrical surface of the first member and rotatable in response to the rotation of motor shaft, a wrap spring surrounding the first and second cylindrical surfaces with one end connected to the second member, and stop means engageable with the other end for causing the spring to be wrapped tightly about the surfaces to rotate the first member with the second member, and said releasing means comprises means for removing said stop means to permit the spring to expand and thus permit said first member to rotate relative to said second member.

33. An actuator of the character defined in claim 29, wherein one of said drive parts is a nut having helical grooves therein, the other drive part is a screw having helical grooves thereabout and extending through the nut, and anti-friction elements are disposed between them for rolling within the helical grooves of both.

34. An actuator for a valve that is opened and closed by the reciprocation of a valve member comprising a housing for mounting on the valve, a valve stem in the housing for connecting to a valve member, a portion of the valve stem having an external helical groove, a ball nut housing balls in engagement with the helical groove on the valve stem, means mounting the ball nut for rotation relative to the valve stem to move the stem longitudinally in one direction to a first position to open or close the valve, resilient means positioned in the housing to be compressed by the movement of the stem in said one direction, and electrically powered means for rotating the ball nut to move the stem to said first position including an electric motor having a first output shaft, a centrifugal clutch mounted on the first output shaft that will engage and drive a second output shaft when the output shaft of the motor reaches a preselected speed of rotation to provide a soft starting torque to the second shaft, a torque limiting device having a third output shaft and connected to the second shaft, and means for transmitting the torque from a third output shaft to the ball nut to rotate the nut and move the valve stem longitudinally to move the valve member to one of said positions, said torque limiting device disconnecting the third shaft from the second shaft when the torque reaches a preselected amount, and electrically powered means for holding the valve member in said position and then releasing the valve member for movement by the resilient means to the other position should the electricity supplied to the holding means be shut off.

35. The fail safe valve of claim 34 in which the torque transmitting means includes a shaft and is further provided with a roller clutch on the shaft, a centrifugal brake having an outer shell on the housing, and a plurality of brake shoes positioned between the roller clutch and the shell for rotation with the roller clutch, said roller clutch allowing free rotation of the output shaft when moving the valve stem to the one position while rotating the brake shoes when the output shaft rotates in the other direction causing the brake shoes to engage the shell and retard the speed of rotation of the output shaft when the compressible means is urging the valve stem to the other position.

36. An actuator for a valve having a body and a closure member movable between alternate positions within the body, comprising
    a housing for mounting a valve body,
    a reversible drive mechanism comprising a first drive part supported for rotation in the housing and a second drive part engageable with the first drive part, and connectible to the closure member for moving it to one of its positions upon rotation of the first part in one direction,
    an electric motor having a rotary shaft,
    clutch means for rotating first drive part in said one direction in response to rotation of the motor shaft but enabling said first drive part to rotate in the opposite direction without rotating the motor shaft,
    means yieldably urging the second drive part in a direction to move the closure member to its other position,
    electrically powered means for preventing said first drive part from rotating in said opposite direction and thus holding the closure member in its one position,
    means for releasing said rotation preventing means to permit said closure member to be moved by said urging means to its other position in response to loss of the supply of electrical power to said rotation preventing means, and
    means for reducing the speed of the motor shaft which is transmitted to the first drive part including a gear train connected between the clutch means and said first drive part.

37. An actuator for a valve having a body and a closure member movable between alternate positions within the body, comprising
    a housing for mounting a valve body,
    a reversible drive mechanism comprising a first drive part supported for rotation in the housing and a second drive part engageable with the first drive part, and connectible to the closure member for moving it to one of its positions upon rotation of the first part in one direction,
    an electric motor having a rotary shaft,
    clutch means for rotating first drive part in said one direction in response to rotation of the motor shaft but enabling said first drive part to rotate in the opposite direction without rotating the motor shaft,
    means yieldably urging the second drive part in a direction to move the closure member to its other position,
    electrically powered means for preventing said first drive part from rotating in said opposite direction and thus holding the closure member in its one position, and
    means for releasing said rotation preventing means to permit said closure member to be moved by said urging means to its other position in response to loss of the supply of electrical power to said rotation preventing means,
    said clutch means including means which is responsive to centrifugal force so as to connect the motor shaft to said first drive part only when the motor shaft attains a given speed.

38. An actuator for a valve having a body and a closure member movable between alternate positions within the body, comprising
    a housing for mounting a valve body,
    a reversible drive mechanism comprising a first drive part supported for rotation in the housing and a second drive part engageable with the first drive part, and connectible to the closure member for moving it to one of its positions upon rotation of the first part in one direction,
    an electric motor having a rotary shaft,
    clutch means for rotating first drive part in said one direction in response to rotation of the motor shaft but enabling said first drive part to rotate in the opposite direction without rotating the motor shaft,
    means yieldably urging the second drive part in a direction to move the closure member to its other position,
    electrically powered means for preventing said first drive part from rotating in said opposite direction and thus holding the closure member in its one position, and
    means for releasing said rotation preventing means to permit said closure member to be moved by said urging means to its other position in response to loss of the supply of electrical power to said rotation preventing means,
    said rotation preventing means including
    a first member having a first cylindrical surface which is rotatable with the first drive part,
    a second member having a second cylindrical surface aligned with the first cylindrical surface of the first member and rotatable in response to the rotation of motor shaft,
    a wrap spring surrounding the first and second cylindrical surface with one end connected to the second member, and
    stop means engageable with the other end for causing the spring to be wrapped tightly about the surfaces to rotate the first member with the second member, and
    said releasing means comprises
    means for removing said stop means to permit the spring to expand and thus permit said first member to rotate relative to said second member.

39. An actuator for a valve having a body and a closure member movable between alternate positions within the body, comprising
    a housing for mounting a valve body,
    a reversible drive mechanism comprising a first drive part supported for rotation in the housing and a second drive part engageable with the first drive part, and connectible to the closure member for moving it to one of its positions upon rotation of the first part in one direction,
    an electric motor having a rotary shaft,
    clutch means for rotating first drive part in said one direction in response to rotation of the motor shaft but enabling said first drive part to rotate in the opposite direction without rotating the motor shaft,
    means yieldably urging the second drive part in a direction to move the closure member to its other position, electrically powered means for preventing said first drive part from rotating in said opposite direction and thus holding the closure member in its one position, and means for releasing said rotation preventing means to permit said closure member to be moved by said urging means to its other position in response to loss of the supply of electrical power to said rotation preventing means, one of said drive parts being a nut having helical grooves therein, the other drive part being a screw having helical grooves thereabout and extending through the nut, and anti-friction elements being disposed between them for rolling within the helical grooves of both.

* * * * *

UNITED STATES PATENT AND TRADEMARK OFFICE
CERTIFICATE OF CORRECTION

PATENT NO. : 5,195,721
DATED : March 23, 1993
INVENTOR(S) : Neil H. Akkerman

It is certified that error appears in the above-indentified patent and that said Letters Patent is hereby corrected as shown below:

column 3, line 36, replace "valve member 20" with --valve member 21--. Column 6, line 13, replace "ball nut 229" with --ball nut 220--. Column 7, line 33, replace "pin 228A" with --pin 288A--. Column 10, line 29, replace "cam surface 520" with --cam surface 519--; line 51, replace "cam 520" with -- cam 519 --; line 65, replace "cam 520" with --cam 519--. Column 11, lines 4-5, replace "cam surface 520" with --cam surface 519--.

Signed and Sealed this

Eleventh Day of January, 1994

Attest:

BRUCE LEHMAN

Attesting Officer

Commissioner of Patents and Trademarks